No. 634,901. Patented Oct. 17, 1899.
G. MÖNNIG.
DEVICE FOR WRINGING OR PRESSING OUT LIQUIDS.
(Application filed Oct. 29, 1898.)
(No Model.)
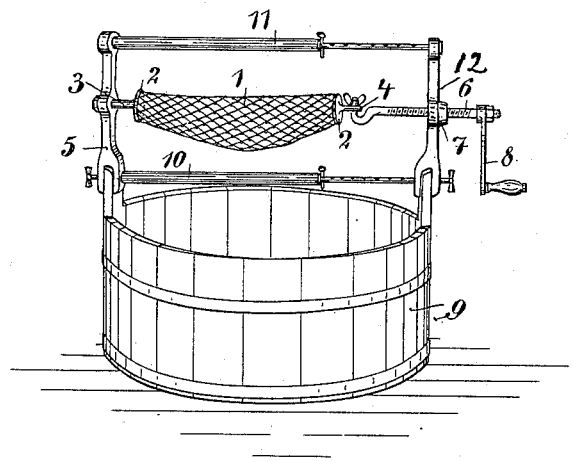
Witnesses:
Inventor:
Gustav Mönnig

UNITED STATES PATENT OFFICE.

GUSTAV MÖNNIG, OF BERLIN, GERMANY.

DEVICE FOR WRINGING OR PRESSING OUT LIQUIDS.

SPECIFICATION forming part of Letters Patent No. 634,901, dated October 17, 1899.

Application filed October 29, 1898. Serial No. 694,969. (No model.)

*To all whom it may concern:*

Be it known that I, GUSTAV MÖNNIG, a subject of the German Emperor, residing at Berlin, Germany, have invented certain new and useful Improvements in Devices for Wringing or Pressing Out Liquids, of which the following is a specification.

This invention consists in a device for wringing or pressing out by simple means the liquid contained in the matter pressed. It can be used to remove useless liquid from compact substances—for instance, as a clothes-wringer—or to press fruits for extracting the juice and for similar purposes.

The annexed drawing shows in perspective view one form of this invention.

It consists principally of a sleeve surrounding the matters to be squeezed, manufactured of strong but porous stuff.

The sleeve in the drawing is a specially-manufactured net 1. This net 1 receives the matters to be pressed and can be used to squeeze linen, fruits, or the like. To squeeze fruit, it is better to put it first in a thin porous sleeve of gauze or the like and then to put this sleeve into the net. The net 1 is fastened at each end to a disk 2, provided, respectively, one with a fixed bar 3 and the other with an eye 4. The bar 3 is best passed through a standard 5, as shown in the drawing. To the eye 4 is connected the hooked end of a screw 6, passing through a female screw 7 in standard 12 and having a crank-handle 8. The standards 5 and 12 are formed at their lower ends as screw-clamps to be fastened on a tub 9. In order to prevent destruction of the tub 9 by the pressure of the screw 6, telescopically-adjustable struts 10 and 11 connect the standards 5 and 12, so that the device may be fitted to tubs of different diameters. These struts are formed each of a tube attached to standard 5 and a rod attached to standard 12. The rod slides loosely in the tube and may be drawn more or less therefrom and a cross-pin inserted in one of a series of holes in the rod, so that on inward thrust of the rod this pin bears against the end of the tube and prevents the rod being thrust farther into the tube, thus holding the standards 5 12 apart at the distance required by the diameter of the tub on which they are clamped.

The material to be pressed is in the net 1. The handle 8 is turned, and thus the net 1 is twisted and stretched at the same time, thus giving pressure on the materials contained in it. The liquid pressed out falls into the tub, while the pressed material can be taken out of the net after revolving the crank-handle 8 in the reversed direction.

I claim as my invention—

1. A device for squeezing out liquids comprising in combination, a frame, a horizontal sleeve 1 of porous material for receiving the matters to be pressed attached at one end to said frame, and a screw-spindle having bearing in a female screw in said frame for twisting and stretching the sleeve and pressing out the liquid contained in the matters in the sleeve.

2. The combination with a tub, of a frame comprising two standards connected by struts, said standards having clamps for attaching them respectively one on each side of the tub, a flexible porous sleeve attached at one end to one of the standards, a screw having bearing in a female screw in the other standard and attached to the other end of said sleeve, and a handle for revolving the screw for the purpose set forth.

3. The combination with a tub, of a frame comprising two standards connected by telescopically-adjustable struts, said standards having clamps for attaching them respectively one on each side of the tub, a flexible porous sleeve attached at one end to one of the standards, a screw having bearing in a female screw in the other standard and attached to the other end of said sleeve, and a handle for revolving the screw for the purpose set forth.

In witness whereof I have signed this specification in the presence of two witnesses.

GUSTAV MÖNNIG.

Witnesses:
C. H. DAY,
HENRY HASPER.